United States Patent
Lee et al.

(10) Patent No.: US 12,334,613 B2
(45) Date of Patent: Jun. 17, 2025

(54) POLYMER ELECTROLYTE MEMBRANE, MEMBRANE-ELECTRODE ASSEMBLY COMPRISING SAME, AND FUEL CELL

(71) Applicant: KOLON INDUSTRIES, INC., Seoul (KR)

(72) Inventors: Eun Su Lee, Seoul (KR); Dong Hoon Lee, Seoul (KR); Na Young Kim, Seoul (KR); Jung Hwa Park, Seoul (KR); Hye Song Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 204 days.

(21) Appl. No.: 17/767,436

(22) PCT Filed: Sep. 17, 2021

(86) PCT No.: PCT/KR2021/012834
§ 371 (c)(1),
(2) Date: Apr. 8, 2022

(87) PCT Pub. No.: WO2022/071684
PCT Pub. Date: Apr. 7, 2022

(65) Prior Publication Data
US 2024/0113318 A1    Apr. 4, 2024

(30) Foreign Application Priority Data
Sep. 29, 2020  (KR) .................. 10-2020-0127266
Sep. 16, 2021  (KR) .................. 10-2021-0124025

(51) Int. Cl.
*H01M 8/1053*    (2016.01)
*H01M 8/10*     (2016.01)
(Continued)

(52) U.S. Cl.
CPC ....... *H01M 8/1053* (2013.01); *H01M 8/1004* (2013.01); *H01M 8/1027* (2013.01);
(Continued)

(58) Field of Classification Search
CPC ............. H01M 8/1053; H01M 8/1004; H01M 8/1027; H01M 8/1032; H01M 8/1039;
(Continued)

(56) References Cited

U.S. PATENT DOCUMENTS

2009/0130516 A1   5/2009  Suzuki
2011/0076595 A1   3/2011  Matsuda
(Continued)

FOREIGN PATENT DOCUMENTS

CN    1965425 A     5/2007
CN    104054201 A   9/2014
(Continued)

OTHER PUBLICATIONS

The JP Office Action, dated Jun. 5, 2023.
(Continued)

*Primary Examiner* — Helen Oi K Conley
(74) *Attorney, Agent, or Firm* — Harvest IP Law, LLP (57) ABSTRACT

A polymer electrolyte membrane having improved chemical or mechanical durability is provided. The present disclosure relates to a polymer electrolyte membrane, and the polymer electrolyte membrane according to the present disclosure comprises a porous support and a composite layer containing a first ionomer filled in the porous support, wherein the polymer electrolyte membrane comprises a first segment having a first durability and a second segment having a second durability, and the first durability is higher than the second durability.

17 Claims, 3 Drawing Sheets

(51) Int. Cl.
*H01M 8/1004* (2016.01)
*H01M 8/1027* (2016.01)
*H01M 8/1032* (2016.01)
*H01M 8/1039* (2016.01)
*H01M 8/1058* (2016.01)
*H01M 8/1067* (2016.01)

(52) U.S. Cl.
CPC ....... *H01M 8/1032* (2013.01); *H01M 8/1039* (2013.01); *H01M 8/1058* (2013.01); *H01M 8/1067* (2013.01); *H01M 2008/1095* (2013.01)

(58) Field of Classification Search
CPC ............. H01M 8/1058; H01M 8/1067; H01M 2008/1095; H01M 8/1025; H01M 2300/0082; H01M 8/1023; H01M 8/103; H01M 2300/0091; H01M 2300/0094; H01M 8/1044; H01M 8/1007; Y02E 60/50

See application file for complete search history.

(56) References Cited

U.S. PATENT DOCUMENTS

2012/0107721 A1   5/2012   Onuma
2013/0084516 A1   4/2013   Schoeneweiss

FOREIGN PATENT DOCUMENTS

| CN | 111164813 A | 5/2020 |
| JP | 06251780 A | 9/1994 |
| JP | 07135004 A | 5/1995 |
| JP | 2005317287 A | 11/2005 |
| JP | 2007-536712 A | 12/2007 |
| JP | 2008-146859 A | 6/2008 |
| JP | 4367470 B2 | 11/2009 |
| JP | 2011071068 A | 4/2011 |
| JP | 2012099336 A | 5/2012 |
| KR | 10-2006-0083372 A | 7/2006 |
| KR | 100660572 B1 | 12/2006 |
| KR | 1020190038355 A | 4/2019 |

OTHER PUBLICATIONS

The CN Office Action, dated Sep. 30, 2023.
The CN Office Action, dated Apr. 19, 2024.
International Search Report dated Jan. 14, 2022.

POLYMER ELECTROLYTE MEMBRANE, MEMBRANE-ELECTRODE ASSEMBLY COMPRISING SAME, AND FUEL CELL

CROSS-REFERENCE TO RELATED APPLICATION

This application is the National Stage filing under 35 U.S.C. 371 of International Application No. PCT/KR2021/012834, filed on Sep. 17, 2021, and claims priority to Korean Patent Application No. 10-2020-0127266, filed on Sep. 29, 2020.

BACKGROUND OF THE DISCLOSURE

Field of the Disclosure

The present disclosure relates to a polymer electrolyte membrane, a membrane-electrode assembly comprising the same, and a fuel cell, and more particularly, to a polymer electrolyte membrane having improved chemical or mechanical durability by using an ionomer having a relatively high equivalent weight (EW) in the first segment, a membrane-electrode assembly comprising the same, and a fuel cell.

Related Art

A fuel cell is a cell that directly converts chemical energy generated by oxidation of fuel into electrical energy, and has been spotlighted as a next-generation energy source due to its high energy efficiency and eco-friendly characteristics with low pollutant emission.

In general, a fuel cell has a structure in which an anode and a cathode are respectively formed on both sides of an electrolyte membrane interposed therebetween, and such a structure is referred to as a membrane-electrode assembly (MEA).

Fuel cells may be classified into an alkaline electrolyte fuel cell, a polymer electrolyte membrane fuel cell (PEMFC), etc. depending on the type of electrolyte membrane. The polymer electrolyte membrane fuel cell among them is in the spotlight as a portable, vehicle, and home power supply device due to its advantages such as a low operating temperature of less than 100° C., fast start-up and response characteristics, and excellent durability.

Typical examples of such a polymer electrolyte membrane fuel cell may include a proton exchange membrane fuel cell (PEMFC) using hydrogen gas as a fuel.

To summarize the reaction that occurs in a polymer electrolyte membrane fuel cell, first, when a fuel such as hydrogen gas is supplied to the anode, hydrogen ions and electrons are generated by the oxidation reaction of hydrogen at the anode. The generated hydrogen ions are transferred to the cathode through the polymer electrolyte membrane, and the generated electrons are transferred to the cathode through an external circuit. Oxygen is supplied to the cathode, and oxygen is combined with hydrogen ions and electrons to produce water by the reduction reaction of oxygen.

Since the polymer electrolyte membrane is a passage through which hydrogen ions generated at the anode are transferred to the cathode, the conductivity of hydrogen ions should be basically excellent. Further, the polymer electrolyte membrane requires characteristics that it should have excellent separation ability of separating hydrogen gas supplied to the anode and oxygen supplied to the cathode, have excellent mechanical strength, dimensional stability, chemical resistance, etc. besides that, and have small resistance loss (ohmic loss) at high current density.

As a polymer electrolyte membrane currently used, there is a perfluorosulfonic acid resin (hereinafter referred to as a 'fluorine-based ion conductor') as a fluorine-based resin. However, since the fluorine-based ion conductor has weak mechanical strength, pinholes are generated when used for a long time, whereby there is a problem in that energy conversion efficiency is decreased. An attempt has been made to use it by increasing the film thickness of the fluorine-based ion conductor in order to reinforce the mechanical strength, but in this case, the resistance loss is increased, and the use of expensive materials is also increased so that there is a problem in that economical efficiency is lowered.

In order to solve such problems, a polymer electrolyte membrane (or a reinforced composite membrane) having improved mechanical strength by impregnating a porous polytetrafluoroethylene resin (trade name: Teflon) (hereinafter referred to as 'Teflon resin'), which is a fluorine-based resin, with a fluorine-based ion conductor in a liquid state has been proposed. In this case, the hydrogen ion conductivity may be somewhat lowered compared to that of a polymer electrolyte membrane made of a fluorine-based ion conductor alone, but as the mechanical strength is relatively excellent, the thickness of the electrolyte membrane can be reduced so that there is an advantage in that resistance loss is reduced.

Meanwhile, when the fuel cell is driven, the reinforced composite membrane corresponding to the gas inlet and/or the gas outlet is subjected to gas pressure to cause deterioration and desorption of the reinforced composite membrane so that there may be a problem in that chemical durability is lowered. In order to solve this problem, research on improving the chemical durability while ensuring high ionic conductivity of the polymer electrolyte membrane is continuously being made.

SUMMARY

An object of the present disclosure is to provide a polymer electrolyte membrane that improves chemical or mechanical durability by preventing deterioration and desorption of the polymer electrolyte membrane when a fuel cell is driven by using a second ionomer having a relatively higher EW than that of a polymer electrolyte membrane comprising a first ionomer in a portion corresponding to the gas inlet and/or gas outlet, a membrane electrode assembly comprising the same, and a fuel cell.

Another object of the present disclosure is to form a polymer electrolyte membrane from a first ionomer having a relatively low EW, and providing a segment comprising a second ionomer with excellent chemical durability on a portion vulnerable to deterioration and desorption, thereby preventing hydrogen ion conductivity from being lowered.

Another object of the present disclosure is to provide a method for manufacturing a polymer electrolyte membrane, the method capable of manufacturing a polymer electrolyte membrane with improved chemical or mechanical durability while using existing process facilities as they are.

The objects of the present disclosure are not limited to the above-mentioned objects, and other objects and advantages of the present disclosure not mentioned can be understood by the following description, and will be more clearly understood by embodiments of the present disclosure. Further, it will be easily seen that the objects and advantages of the present disclosure can be realized by means indicated in the claims and combinations thereof.

A polymer electrolyte membrane according to an embodiment of the present disclosure for achieving the above object is a polymer electrolyte membrane comprising a porous support and a composite layer containing a first ionomer filled in the porous support, wherein the polymer electrolyte membrane corresponds to one comprising a first segment having a first durability and a second segment having a second durability, and the first durability is higher than the second durability.

A membrane-electrode assembly according to an embodiment of the present disclosure for achieving the above object is comprising a first electrode, a second electrode, and a polymer electrolyte membrane comprising a composite layer, which is interposed between the first and second electrodes and contains a porous support a first ionomer filled in the porous support, wherein the polymer electrolyte membrane comprises a first segment having a first durability and a second segment having a second durability, and the first durability is higher than the second durability.

A fuel cell according to an embodiment of the present disclosure for achieving the above object comprises a first separator, a second separator, and the membrane-electrode assembly interposed between the first and second separators, wherein the first electrode is disposed between the first separator and the polymer electrolyte membrane, the first separator includes a first inlet for a first gas to be supplied to the first electrode, a first outlet for the first gas, and a first flow channel between the first inlet and the first outlet, and the first segment corresponds to a segment corresponding to the first inlet or the first outlet.

According to the present disclosure, it is possible to provide a polymer electrolyte membrane that improves chemical or mechanical durability by preventing deterioration and desorption of the polymer electrolyte membrane when driving a fuel cell. According to the present disclosure, it is possible to provide a method for manufacturing a polymer electrolyte membrane with improved chemical or mechanical durability while using existing process facilities as they are.

In addition to the above-described effects, the specific effects of the present disclosure will be described together while explaining the specific contents for carrying out the invention below.

DESCRIPTION OF EXEMPLARY EMBODIMENTS

According to an embodiment of the present disclosure, there is provided a polymer electrolyte membrane comprising a porous support and a composite layer containing a first ionomer filled in the porous support, wherein the polymer electrolyte membrane comprises a first segment having a first durability and a second segment having a second durability, and the first durability is higher than the second durability.

Hereinafter, each configuration of the present disclosure will be described in more detail so that those of ordinary skill in the art to which the present disclosure pertains can easily carry out, but this is only an example, and the scope of the present disclosure is not limited by the following contents.

The polymer electrolyte membrane according to the present disclosure may comprise a composite layer containing a porous support and a first ionomer filled in the porous support. Specifically, a first ionomer dispersion having high dispersion stability not only is excellent in impregnation properties, but also has a small and uniform particle size. Therefore, when the first ionomer dispersion is impregnated and coated on the porous support to form a reinforced composite membrane-type polymer electrolyte membrane, it is possible to improve both of the ionic conductivities of the polymer electrolyte membrane in the plane direction and in the thickness direction by allowing a water channel providing a hydrogen ion movement path to be well formed in the thickness direction as well as in the plane direction. In the present specification, the composite layer may correspond to a reinforced composite membrane.

Hereinafter, the configuration of the present disclosure will be described in more detail.

The porous support according to the present disclosure is made of an aggregate of nanofibers connected three-dimensionally irregularly and discontinuously, and thus includes a plurality of uniformly distributed pores. The porous support composed of a plurality of uniformly distributed pores has excellent porosity and characteristics (such as dimensional stability) that can complement the physical properties of the ion conductor.

The pore diameter, which is the diameter of the pores formed in the porous support, may be formed within a range of 0.05 to 30 μm (micrometers), and when the pore diameter is less than the above numerical range, the ionic conductivity of the polymer electrolyte may be lowered, and when it exceeds the above numerical range, the mechanical strength of the polymer electrolyte may be lowered.

The porosity indicating the degree of formation of pores of the porous support may be formed within a range of 50 to 98%. When the porosity of the porous support is less than the above range, the ionic conductivity of the polymer electrolyte may be reduced, and when it exceeds the above range, the mechanical strength and shape stability of the polymer electrolyte may be deteriorated.

The porosity (%) can be calculated by the ratio of the air volume to the total volume of the porous support as shown in Equation 1 below.

Porosity (%)=(air volume/total volume)×100     [Equation 1]

At this time, the total volume of the porous support is calculated by preparing a sample of the porous support having a rectangular shape and measuring the width, length, and thickness of the sample, and the polymer volume inversely calculated from the density after measuring the mass of the sample of the porous support can be obtained by subtracting the measured mass of the sample of the porous support from the total volume of the porous support.

The porous support is made of an aggregate of nanofibers connected three-dimensionally irregularly and discontinuously, and the average diameter of the nanofibers may be in a range of 0.005 to 5 μm (micrometers). When the average diameter of the nanofibers is less than the above numerical range, the mechanical strength of the porous support may be deteriorated, and when it exceeds the above numerical range, it may not be easy to control the porosity of the porous support.

The nanofibers may be any one selected from the group consisting of nylon, polyimide, polybenzoxazole, polyethylene terephthalate, polyethylene, polypropylene, polytetrafluoroethylene, poly(arylene ether sulfone), polyether ether ketone, copolymers thereof, and combinations thereof, but the technical spirit of the present disclosure is not limited thereto.

The porous support may be formed to a thickness of 5 to 30 μm (micrometers). When the thickness of the porous support is less than the above thickness range, the mechanical strength and morphological stability of the polymer electrolyte may decrease, and when it exceeds the above thickness range, the resistance loss of the polymer electrolyte may increase.

The porous support may comprise a perfluorinated polymer with high resistance to thermal and chemical decomposition [e.g., polytetrafluoroethylene (PTFE), or a copolymer of tetrafluoroethylene and $CF_2=CFC_nF_{2n+1}$ (n is a real number from 1 to 5) or $CF_2=CFO-(CF_2CF(CF_3)O)_mC_nF_{2n+1}$ (m is a real number from 0 to 15, and n is a real number from 1 to 15)]. As another example, a commercially available stretched polytetrafluoroethylene film (e-PTFE film) may be used as the porous support.

The porous support according to the present disclosure may correspond to a nonwoven web formed of a polymer for forming the nonwoven web. For example, the porous support may be a nanoweb in which nanofibers having an average diameter of 40 to 5,000 nm are randomly arranged.

The polymer for forming the nonwoven web may correspond to a polymer that has excellent chemical resistance and has no fear of shape deformation due to moisture in a high humidity environment.

For example, the polymer for forming the nonwoven web may be aliphatic polyamide, aromatic polyamide, polyimide, polyetherimide, polyacrylonitrile, polyaniline, polyethylene oxide, polyethylene naphthalate, polybutylene terephthalate, styrene-butadiene rubber, polystyrene, polyvinyl chloride, polyvinyl alcohol, polyvinylidene fluoride, polyvinyl butyral, polyurethane, polybenzoxazole, polybenzimidazole, polyamideimide, polyethylene terephthalate, polyphenylene sulfide, polyethylene, polypropylene, copolymers of two or more thereof, or mixtures of two or more thereof.

In particular, polyimide is one of preferable candidate substances for the formation of the porous support in that it has excellent heat resistance, chemical resistance, and morphological stability.

The composite layer according to the present disclosure may contain the first ionomer filled in the porous support. Specifically, the composite layer may comprise a first surface and a second surface opposite to the first surface. That is, the first surface and the second surface may refer to, for example, surfaces opposite to each other, and may refer to an upper surface and a lower surface of the composite layer respectively.

The polymer electrolyte membrane according to another embodiment of the present disclosure may comprise a first resin layer disposed on the first surface and a second resin layer disposed on the second surface. The first and second resin layers may contain the first ionomer.

The resin layer is an ionomer layer additionally added to both surfaces of the composite layer separately from the first segment and the second segment according to the present disclosure.

Figure 1:
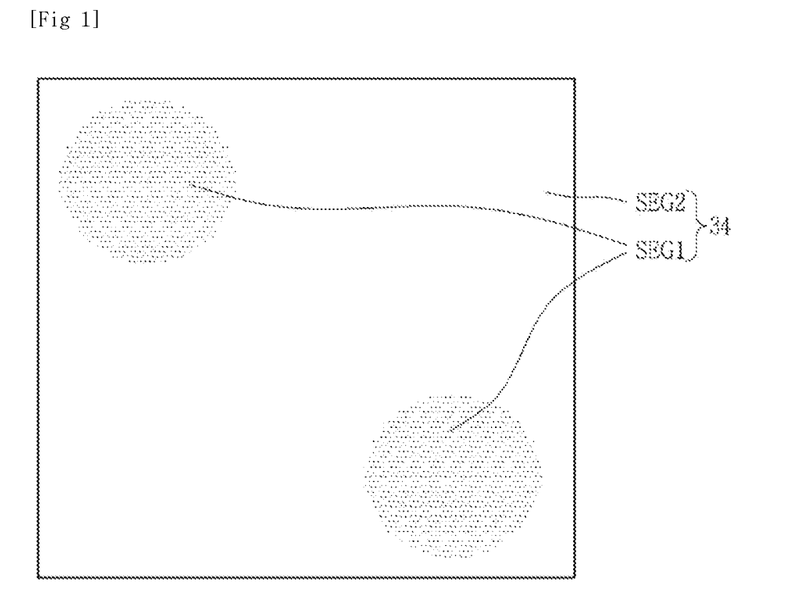
FIG. 1 shows a plane view of a polymer electrolyte membrane according to an embodiment of the present disclosure.

FIG. 1 shows a plane view of a polymer electrolyte membrane according to an embodiment of the present disclosure.

Figure 2:
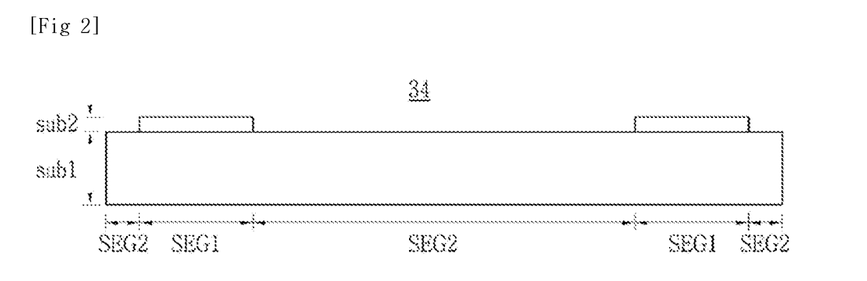
FIG. 2 shows a side view of the polymer electrolyte membrane according to an embodiment of the present disclosure.

FIG. 2 shows a side view of the polymer electrolyte membrane according to an embodiment of the present disclosure.

Hereinafter, for convenience of the description, the configuration of the present disclosure will be described in detail with reference to FIGS. 1 and 2.

Referring to FIGS. 1 and 2, a polymer electrolyte membrane 34 according to the present disclosure may comprise a first segment SEG1 having a first durability and a second segment SEG2 having a second durability. The first durability is characterized in that it is higher than the second durability. In the present specification, durability may mean chemical or mechanical durability.

Specifically, the first segment SEG1 may comprise a first sub-layer sub1 and a second sub-layer sub2 disposed on the first sub-layer sub1. That is, the first segment SEG1 may comprise at least two sub-layers.

For example, the first segment SEG1 may have a double layer structure including a first sub-layer sub1 and a second sub-layer sub2, and the second segment may have a single layer structure. At this time, the first sub-layer sub1 and the second segment SEG2 may contain a first ionomer, and the second sub-layer sub2 may contain a second ionomer. The durability of the second ionomer may be higher than that of the first ionomer.

According to an embodiment of the present disclosure, the first sub-layer sub1 and the second segment SEG2 may be arranged side by side.

The second sub-layer sub2 may be disposed directly on the first sub-layer sub1, and it is preferable that any member is not interposed between the first sub-layer sub1 and the second sub-layer sub2.

The first ionomer may be a fluorine-based ionomer, more preferably a perfluorosulfonic acid (PFSA)-based ionomer. The second ionomer may include a fluorine-based ionomer, or a blend of a hydrocarbon-based ionomer and a fluorine-based ionomer.

The blend of the hydrocarbon-based ionomer and the fluorine-based ionomer may correspond to, for example, a blend of perfluorosulfonic acid (PFSA) and a hydrocarbon-based ionomer.

The hydrocarbon-based ionomer may include, for example, one or more selected from the group consisting of sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, and sulfonated polyarylene ether sulfone ketone.

The first ionomer may include a first fluorine-based ionomer, and the second ionomer may include a second fluorine-based ionomer. The first and second fluorine-based ionomers may be a fluorine-based polymer containing at least one cation exchange group selected from the group consisting of a sulfonic acid group, a carboxyl group, a boronic acid group, a phosphoric acid group, an imide group, a sulfonimide group, a sulfonamide group, a sulfonic acid fluoride group, and derivatives thereof.

For example, the fluorine-based polymer may be poly (perfluorosulfonic acid), poly(perfluorocarboxylic acid), a copolymer of tetrafluoroethylene containing a sulfonic acid group and fluorovinyl ether, defluorinated sulfide polyether ketone, or mixtures of two or more thereof.

The fluorine-based polymer may be an anion conductor having an anion exchange group. Specifically, the anion conductor is a polymer capable of transporting anions such as hydroxy ions, carbonate or bicarbonate. As the anion conductor, a polymer doped with a metal hydroxide may be generally used, and specifically, poly(ethersulfone), polystyrene, a vinyl-based polymer, poly(vinyl chloride), poly (vinylidene fluoride), poly(tetrafluoroethylene), poly(benzimidazole), or poly(ethylene glycol) which is doped with a metal hydroxide may be used.

An equivalent weight (EW) of the second fluorine-based ionomer may be greater than an EW of the first fluorine-based ionomer. Specifically, the second fluorine-based ionomer and the first fluorine-based ionomer may have an EW difference corresponding to 100 to 500 g/eq.

The first fluorine-based ionomer may include a perfluorosulfonic acid (PFSA)-based ionomer having an EW of 600 to 800 g/eq, and the second fluorine-based ionomer may include a PFSA-based ionomer having an EW of 900 to 1,100 g/eq.

Meanwhile, in an embodiment of the present disclosure, the first ionomer constituting the second segment SEG2 may include a third fluorine-based ionomer, and the second ionomer may include a blend of a fourth fluorine-based ionomer and a hydrocarbon-based ionomer. The second ionomer may have an ion exchange capacity (IEC) of 0.8 to 1.9 meq/g.

The blend of the fourth fluorine-based ionomer and the hydrocarbon-based ionomer may have an ion exchange capacity (IEC) corresponding to 0.8 to 1.9 meq/g, and when the ion exchange capacity (IEC) is out of the above numerical range, the ionic conductivity of the polymer electrolyte membrane may be lowered.

The third and fourth fluorine-based ionomers may be a fluorine-based polymer containing at least one cation exchange group selected from the group consisting of a sulfonic acid group, a carboxyl group, a boronic acid group, a phosphoric acid group, an imide group, a sulfonimide group, a sulfonamide group, a sulfonic acid fluoride group, and derivatives thereof.

In an embodiment of the present disclosure, the third and fourth fluorine-based ionomers may be the same as or different from each other. Specifically, when the third and fourth fluorine-based ionomers are different from each other, the third and fourth fluorine-based ionomers may each independently include a perfluorosulfonic acid-based ionomer having an EW of 500 to 1,100 g/eq.

Specifically, the third fluorine-based ionomer preferably has an EW of 600 to 800 g/eq. Since the fourth fluorine-based ionomer is blended with the hydrocarbon-based ionomer that increases strength, it may have an EW value of 600 g/eq or less. That is, the fourth fluorine-based ionomer preferably has an EW of 500 to 1,100 g/eq, more preferably 700 to 900 g/eq.

The first ionomer may be used in order to improve the physical durability of the fuel cell system so that a reinforced composite membrane, which is another type of a polymer electrolyte membrane, may be formed. Specifically, the reinforced composite membrane may be manufactured by impregnating the porous support with the first ionomer dispersion as part of increasing the mechanical durability of the polymer electrolyte membrane in the form of a single membrane.

The reinforced composite membrane may be composed of a porous support for improving dimensional stability, durability, mechanical strength, etc., which are disadvantages of a single electrolyte membrane, together with an ion conductor that is an electrolyte material. Specifically, the first ionomer may have a low equivalent weight (EW) value in order to secure high ionic conductivity of the polymer electrolyte.

Meanwhile, when the reinforced composite membrane is subjected to pressure from the first segment corresponding to the gas inlet and/or gas outlet of the anode plate when the fuel cell is driven, there is a problem in that the reinforced composite membrane containing the first ionomer is deteriorated and desorbed. Due to this, the chemical durability of the reinforced composite membrane is lowered, and thus the performance of the fuel cell is deteriorated.

Specifically, the reinforced composite membrane containing the first ionomer is thermally stable up to 150° C. because of the strong CF bond and the shielding effect of electrically negative fluorine atoms, and starts to deteriorate at a temperature of 150° C. or higher so that the sulfonic acid group, which is a side chain, may be broken off at high temperatures of 280° C. or higher. Electrochemical degradation of the polymer electrolyte membrane is caused by hydrogen peroxide and radicals formed when hydrogen and oxygen passing through the membrane meet on the catalyst. That is, the hydrogen peroxide and radicals break the bond between the polymers constituting the first ionomer, thereby reducing cell performance and lifespan.

An object of the present disclosure is to improve chemical or mechanical durability by suppressing the deterioration reaction as described above.

In order to solve this, the polymer electrolyte membrane according to the present disclosure may correspond to one that improves chemical or mechanical durability by further including a first segment coated with a second ionomer in a segment corresponding to the gas inlet and/or gas outlet of the anode plate.

Specifically, the improvement in chemical degradation of the polymer electrolyte membrane according to the present disclosure can be confirmed by hydrogen permeability, OCV accelerated durability evaluation, and accompanying Fluoride Ion Emission Rate (FER) test.

When the hydrogen permeability is measured, it can be inferred that the polymer electrolyte membrane according to the present disclosure exhibits a lower value of hydrogen permeability compared to the polymer electrolyte membrane to which only the first fluorine-based ionomer is applied without applying the second fluorine-based ionomer.

For example, when Open Circuit Voltage (OCV) durability is measured, the polymer electrolyte membrane according to the present disclosure may exhibit higher OCV durability than the polymer electrolyte membrane to which only the first fluorine-based ionomer is applied without applying the second fluorine-based ionomer. The OCV durability may be figured out through a change in OCV(V) according to time (hr).

The Fluoride Ion Emission Rate (FER) test is an experiment for measuring the fluorine outflow rate by performing an OCV acceleration test of a polymer electrolyte membrane. The polymer electrolyte membrane according to the present disclosure exhibits a higher value in the cell life than the polymer electrolyte membrane to which only the first fluorine-based ionomer is applied so that it can be inferred that chemical durability will be improved.

Specifically, the second ionomer is characterized by having a relatively higher EW value than that of the first ionomer. The higher the EW value, the slightly lower the ionic conductivity, but the chemical or mechanical durability of the portion of the polymer electrolyte membrane corresponding to the gas inlet and/or gas outlet, comprising the second ionomer, may be improved.

The first segment may occupy 50% or less of the total active area based on one surface of the polymer electrolyte membrane, and the first segment is preferably 5 to 40% of the total active area of the polymer electrolyte membrane. More preferably, 10 to 30% is appropriate. When the area of the first segment is smaller than the area of the above numerical range, the effect of improving the chemical or mechanical durability of the polymer electrolyte membrane may not appear, and when it is larger than the area of the above numerical range, the hydrogen ion conductivity of the polymer electrolyte membrane may drop.

The method for manufacturing a polymer electrolyte membrane according to the present disclosure may comprise the steps of manufacturing an electrolyte membrane by immersing a porous support in a first ionomer dispersion and then drying it, and forming a first segment by coating a second ionomer on a portion of the surface of the dried electrolyte membrane corresponding to the gas inlet and/or gas outlet of the anode plate of the fuel cell, wherein the second ionomer may have a relatively higher EW value than that of the first ionomer.

A general method for manufacturing a polymer electrolyte membrane may comprise the steps of casting a dispersion containing an ionomer, putting the porous support in a dry state on the dispersion, thereby making the porous support into a wet state as a whole, and drying the porous support in the wet state.

The polymer electrolyte membrane according to the present disclosure may be manufactured by further comprising the step of coating the second ionomer in the existing manufacturing method.

Specifically, as described above, the steps of casting a dispersion containing a first ionomer and putting the porous support in a dry state on the dispersion, thereby making the porous support into a wet state as a whole are performed. Thereafter, the first segment may be formed by performing the step of coating the second ionomer on the region where a first segment is to be formed.

More specifically, the step of forming the first segment may comprise coating the second ionomer with any one selected from a spray method and a laminating method.

The first segment SEG1 may have a thickness of 5 to 100 μm (micrometers), preferably 7 to 60 μm (micrometers). The second sub-layer sub2 may preferably have a thickness of 1 to 10 μm (micrometers).

Meanwhile, a step difference may exist between the second segment SEG2 and the first segment SEG1, and the difference may be 1 to 10 μm (micrometers). More preferably, the step difference may be 1 to 5 μm (micrometers), and when the step difference is out of the above step difference range, problems in the electrode transfer uniformity of the membrane-electrode assembly and the fastening pressure deviation during cell fastening may occur.

The spray method means coating the second ionomer on the first segment using a sprayer, and the laminating method means a technique for protecting the surface and increasing strength and stability by thinly covering the first segment with the second ionomer. The second sub-layer sub2 may be, for example, a single layer or a multilayer, and the technical spirit of the present disclosure is not limited to the number of layers.

Specifically, the spray method may be performed by, for example, fixing a treated porous support flatly to a mold manufactured in a predetermined shape and spraying a second ionomer dispersion at a predetermined distance using an ultrasonic spray gun. The second ionomer dispersion may be sprayed at a flow rate of about 1 to 1,000 ml/sec under a frequency of about 20 to 130. When spraying the second ionomer toward the porous support, it is preferable to spray it substantially in the direction of gravity. In this case, the direction in which the second ionomer dispersion is sprayed and the direction of gravity are substantially identical so that the impregnation force can be maximized when the spray method is performed.

The laminating method refers to a manufacturing method of thermally transferring the second ionomer to the first segment by a laminator roll constituting the machine by using a laminator machine.

The temperature for thermally transferring the second ionomer to the first segment using the laminator roll is preferably 80 to 160° C., more preferably 90 to 130° C. When the temperature exceeds the above numerical range, there may be a problem in that the fluorine-based ionomer is decomposed by heat.

Further, the step of forming the first segment can be introduced into in-line without an additional process in the R2R (Roll to Roll) process, which is one of the reinforced composite membrane manufacturing processes, so that there is an advantage in that manufacturing costs can be saved.

The porous support may be formed by dissolving a precursor in a spinning solvent to prepare a spinning solution, spinning the prepared spinning solution to manufacture a porous nanoweb composed of nanofibers having an average diameter of 0.005 to 5 μm (micrometers), and then performing a process of post-treating the manufactured nanoweb.

The porous support is preferably prepared through an electrospinning process in order to obtain high porosity, fine pores, and a thin film, but the technical spirit of the present disclosure is not limited thereto.

The porous support may be prepared by spinning any one selected from the group consisting of nylon, polyimide, polybenzoxazole, polyethylene terephthalate, polyethylene, polypropylene, polytetrafluoroethylene, polyarylene ether sulfone, polyether ether ketone, copolymers thereof, and combinations thereof.

Hereinafter, the configuration of the present disclosure will be described with reference to FIGS. 1 to 3.

Figure 3:
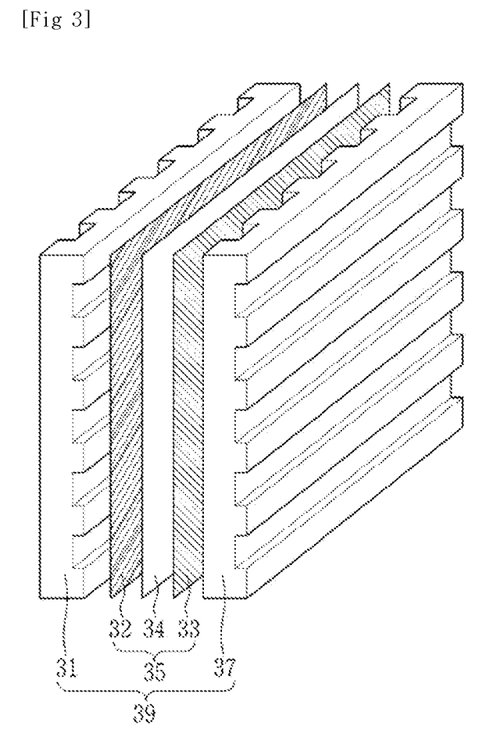
FIG. 3 shows a fuel cell according to an embodiment of the present disclosure.

FIG. 3 shows a fuel cell according to an embodiment of the present disclosure.

Referring to FIGS. 1 to 3, a membrane-electrode assembly 35 according to an embodiment of the present disclosure may comprise a first electrode 32, a second electrode 33, and a polymer electrolyte membrane 34 according to some embodiments, which is interposed between the first and second electrodes 32 and 33. Specifically, the first electrode 32 may be a cathode in which the reduction reaction of oxygen occurs, and the second electrode 33 may be an anode in which the oxidation reaction of hydrogen occurs. The polymer electrolyte membrane is the same as the polymer electrolyte membrane according to an embodiment of the present disclosure described above, and repeated description will be omitted.

A fuel cell 39 according to another embodiment of the present disclosure may be characterized in that it comprises a first separator 31, a second separator 37, and the membrane-electrode assembly 35 interposed between the first and second separators 31 and 37, wherein the first electrode 32 is disposed between the first separator 31 and the polymer electrolyte membrane 34, the first separator 31 includes a first inlet for a first gas to be supplied to the first electrode 32, a first outlet for the first gas, and a first flow channel between the first inlet and the first outlet, and the first segment SEG1 is a segment corresponding to the first inlet or the first outlet.

The fuel cell according to another embodiment of the present disclosure may further comprise a gas diffusion layer between the above-described separator and the battery. Detailed description of the gas diffusion layer will be omitted since it is obvious to those skilled in the art.

Hereinafter, Examples of the present disclosure will be described in detail so that the present disclosure can be easily practiced by those skilled in the art to which the present disclosure pertains, but these are merely examples, and the scope of the present disclosure is not limited by the following content.

Manufacturing Example 1: Manufacturing of Polymer Electrolyte Membranes

Polymer electrolyte membranes according to Comparative Example 1 and Examples 1 to 3 below were manufactured.

Comparative Example 1

After an ionomer dispersion containing 20% by weight of a fluorine-based polymer (perfluorosulfonic acid; PFSA) having an equivalent weight (EW) of 600 g/eq was prepared, a porous support (e-PTFE, pore size: 0.10 μm to 0.15 μm, thickness: 6 μm, tensile elongation ratio (MD/TD): 1.1) was immersed therein, and then dried at 60° C. for 1 hour to prepare a composite layer. Thereafter, the same ionomer dispersion was additionally applied to both surfaces of the composite layer, and then a polymer electrolyte membrane was manufactured by performing primary drying at 60° C. for 1 hour and performing secondary drying at 150° C. for 30 minutes.

Example 1

After an ionomer dispersion containing 20% by weight of a fluorine-based polymer (perfluorosulfonic acid; PFSA) having an equivalent weight (EW) of 600 g/eq was prepared, a porous support (e-PTFE, pore size: 0.10 μm to 0.15 μm, thickness: 6 μm, tensile elongation ratio (MD/TD): 1.1) was immersed therein, and then dried at 60° C. for 1 hour to prepare a composite layer. Thereafter, the same ionomer dispersion was additionally applied to both surfaces of the composite layer, and then a polymer electrolyte membrane was manufactured by performing primary drying at 60° C. for 1 hour and performing secondary drying at 150° C. for 30 minutes. Thereafter, a fluorine-based polymer (perfluorosulfonic acid; PFSA) having an equivalent weight (EW) of 900 g/eq was additionally applied to edge portions of both surfaces of the polymer electrolyte membrane corresponding to the first segment corresponding to the gas inlet and gas outlet using a spray injection method (equipment: spray gun, separation distance: 10 cm, injection amount: 1 ml/min). As a result, second sub-layers having a thickness of 5 μm were each formed on the edge portions of both surfaces of the polymer electrolyte membrane.

Example 2

A polymer electrolyte membrane was manufactured in the same manner as in Example 1 except that a second sub-layer having a thickness of 2 to 3 μm was formed on the edge portions of both surfaces of the polymer electrolyte membrane by using a thermal laminating method with a heat roller temperature of 150° C. instead of the spray injection method.

Example 3

A polymer electrolyte membrane was manufactured in the same manner as in Example 1 except that a blend (ion exchange capacity: 1.0 meq/g) in which perfluorosulfonic acid (PFSA) and sulfonated polyetheretherketone (SPEEK) were mixed at a weight ratio of 1:1 was used instead of the fluorine-based polymer having an equivalent weight (EW) of 900 g/eq.

Manufacturing Example 2: Manufacturing of Membrane-Electrode Assemblies

Membrane-electrode assemblies were manufactured by directly coating an electrode slurry on both surfaces of the polymer electrolyte membranes according to Manufacturing Example 1. The electrode slurry contains Pt/C and a binder (PFSA) mixed at a weight ratio of 3:2.

Experimental Example 1: OCV Hold Test of Membrane-Electrode Assemblies

The chemical durabilities of the membrane-electrode assemblies according to Manufacturing Example 2 above were evaluated. Specifically, after evaluating the hydrogen permeability (LSV method) every 100 hours under the protocol (90° C., 30RH, 50 kPa, An=$H_2$/Ca=Air), the evaluation was terminated if, compared to the initial value, it increased 10 times or more, or the OCV loss was 20% or more.

Figure 4:
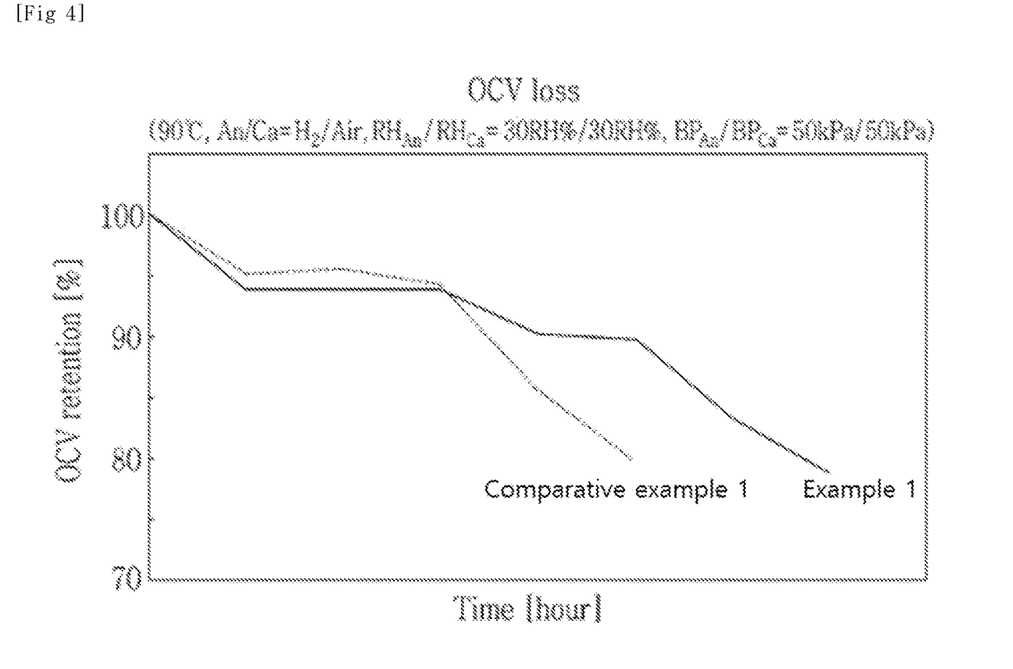
FIG. 4 shows an OCV hold test of each of membrane-electrode assemblies comprising polymer electrolyte membranes according to Example 1 and Comparative Example 1.

FIG. 4 shows an OCV hold test of each of membrane-electrode assemblies comprising polymer electrolyte membranes according to Example 1 and Comparative Example 1.

Referring to FIG. 4, it can be seen as time elapses that 20% is reached fast by the OCV loss of the membrane-electrode assembly comprising the polymer electrolyte membrane according to Comparative Example 1 compared to the OCV loss of the membrane-electrode assembly comprising the polymer electrolyte membrane according to Example 1. Through this, it can be confirmed that chemical durability is improved by the introduction of the first segment corresponding to the gas inlet and gas outlet.

In the case of the membrane-electrode assemblies comprising the polymer electrolyte membranes according to Examples 2 and 3, the OCV hold test was performed under the same protocol as in FIG. 4 to obtain the results shown in Table 1 below.

TABLE 1

| 90° C., 30RH, 50 kPa, An = H₂/Ca = Air | Comparative Example 1 | Example 1 | Example 2 | Example 3 |
|---|---|---|---|---|
| Elapsed time (hour) when OCV loss is 20% | 500 | 700 | 600 | 800 |

Referring to Table 1 above, it can be confirmed that it takes a long time (hours) for the OCV loss to reach 20% during deterioration in the membrane-electrode assemblies comprising the polymer electrolyte membranes according to Examples 1 to 3 in contrast with the membrane-electrode assembly comprising the polymer electrolyte membrane according to Comparative Example 1. Through this, it can be confirmed that the chemical durabilities of the membrane-electrode assemblies comprising the polymer electrolyte membranes according to Examples 1 to 3 are remarkably improved compared to that according to Comparative Example 1. In particular, comparing Examples 1 and 3, it can be inferred that the effect of chemical durability is greater when a second sub-layer is made of a blend of a hydrocarbon-based ionomer and a fluorine-based ionomer than when the second sub-layer is made of a fluorine-based ionomer having a relatively large equivalent weight.

Hereinabove, exemplary embodiments of the present disclosure have been described in detail, but the scope of the present disclosure is not limited thereto, and various changes or modified forms of those skilled in the art using a basic concept of the present disclosure defined in the following claims also fall within the scope of the present disclosure.

What is claimed is:

1. A polymer electrolyte membrane comprising:
a porous support; and
a composite layer containing a first ionomer filled in the porous support,
wherein the polymer electrolyte membrane comprises a first segment having a first durability and a second segment having a second durability, and the first durability is higher than the second durability,
wherein the first segment comprises a first sub-layer and a second sub-layer disposed on the first sub-layer, the second segment has a single layer structure, the first sub-layer and the second segment contain a first ionomer, the second sub-layer contains a second ionomer, and the durability of the second ionomer is higher than that of the first ionomer.

2. The polymer electrolyte membrane of claim 1, wherein the first sub-layer and the second segment are arranged side by side.

3. The polymer electrolyte membrane of claim 1, wherein the first ionomer includes a first fluorine-based ionomer, the second ionomer includes a second fluorine-based ionomer, and an equivalent weight (EW) of the second fluorine-based ionomer is greater than an EW of the first fluorine-based ionomer.

4. The polymer electrolyte membrane of claim 3, wherein the first fluorine-based ionomer includes a perfluorosulfonic acid (PFSA)-based ionomer having an EW of 600 to 800 g/eq, and the second fluorine-based ionomer includes a PFSA-based ionomer having an EW of 900 to 1,100 g/eq.

5. The polymer electrolyte membrane of claim 3, wherein the second fluorine-based ionomer and the first fluorine-based ionomer have an EW difference of 100 to 500 g/eq.

6. The polymer electrolyte membrane of claim 1, wherein the first ionomer includes a third fluorine-based ionomer, and the second ionomer includes a blend of a fourth fluorine-based ionomer and a hydrocarbon-based ionomer.

7. The polymer electrolyte membrane of claim 6, wherein the second ionomer has an ion exchange capacity (IEC) of 0.8 to 1.9 meq/g.

8. The polymer electrolyte membrane of claim 6, wherein the third and fourth fluorine-based ionomers each independently include a perfluorosulfonic acid-based ionomer having an EW of 500 to 1,100 g/eq.

9. The polymer electrolyte membrane of claim 8, wherein the third fluorine-based ionomer has an EW of 600 to 800 g/eq, and the fourth fluorine-based ionomer has an EW of 500 to 1,100 g/eq.

10. The polymer electrolyte membrane of claim 9, wherein the fourth fluorine-based ionomer has an EW of 700 to 900 g/eq.

11. The polymer electrolyte membrane of claim 6, wherein the hydrocarbon-based ionomer includes one or more selected from the group consisting of sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, and sulfonated polyarylene ketone ether sulfone ketone.

12. The polymer electrolyte membrane of claim 6, wherein the third fluorine-based ionomer and the fourth fluorine-based ionomer are the same as each other.

13. The polymer electrolyte membrane of claim 1, wherein the first segment occupies 50% or less of the total active area based on one surface of the polymer electrolyte membrane.

14. The polymer electrolyte membrane of claim 1, wherein the composite layer comprises a first surface and a second surface opposite to the first surface, the polymer electrolyte membrane further comprises: a first resin layer disposed on the first surface; and a second resin layer disposed on the second surface, and the first and second resin layers contain the first ionomer.

15. A membrane-electrode assembly comprising:
a first electrode;
a second electrode; and
the polymer electrolyte membrane according to claim 1, which is interposed between the first and second electrodes.

16. The membrane-electrode assembly of claim 15, wherein the first electrode is a cathode in which the reduction reaction of oxygen occurs, and the second electrode is an anode in which the oxidation reaction of hydrogen occurs.

17. A fuel cell comprising:
a first separator;
a second separator; and
the membrane-electrode assembly according to claim 15, which is interposed between the first and second separators,
wherein the first electrode is disposed between the first separator and the polymer electrolyte membrane, the first separator includes a first inlet for a first gas to be supplied to the first electrode, a first outlet for the first gas, and a first flow channel between the first inlet and the first outlet, and the first segment is a segment corresponding to the first inlet or the first outlet.

* * * * *